(12) United States Patent
Walker (10) Patent No.: US 7,581,835 B1
(45) Date of Patent: Sep. 1, 2009

(54) LIGHT SHOW DEVICE AND METHOD OF ENTERTAINING

(76) Inventor: Brian W. Walker, 21165 Scottsdale Dr., Bend, OR (US) 97701

( * ) Notice: Subject to any disclaimer, the term of this patent is extended or adjusted under 35 U.S.C. 154(b) by 1034 days.

(21) Appl. No.: 10/992,664

(22) Filed: Nov. 22, 2004

(51) Int. Cl.
*G03B 21/00* (2006.01)
*G02B 27/08* (2006.01)
*G03H 1/02* (2006.01)
*H01S 3/123* (2006.01)
*H01S 3/08* (2006.01)

(52) U.S. Cl. .............................. 353/1; 353/2; 359/616; 359/617; 359/27; 372/15; 372/99

(58) Field of Classification Search ................. 353/1–2; 359/616–617, 27; 372/15, 99
See application file for complete search history.

(56) References Cited

U.S. PATENT DOCUMENTS

| 2,553,005 | A | * | 5/1951 | Regan | 353/2 |
|---|---|---|---|---|---|
| 3,358,556 | A | * | 12/1967 | Brown | 353/2 |
| 3,885,865 | A | * | 5/1975 | Stern et al. | 353/2 |
| 5,132,844 | A | * | 7/1992 | Sharp, Jr. | 359/617 |
| 5,143,444 | A | * | 9/1992 | Shields | 362/293 |
| 5,469,297 | A | * | 11/1995 | Marshall et al. | 359/617 |
| 5,526,076 | A | * | 6/1996 | Walker | 353/43 |
| 5,980,043 | A | * | 11/1999 | Wong | 353/2 |
| 6,332,686 | B1 | * | 12/2001 | Yoda | 359/617 |
| 7,101,046 | B2 | * | 9/2006 | Hattori et al. | 353/1 |
| 7,207,682 | B2 | * | 4/2007 | Stephens | 359/616 |

* cited by examiner

*Primary Examiner*—Diane I Lee
*Assistant Examiner*—Magda Cruz
(74) *Attorney, Agent, or Firm*—Andrew F. Knight (57) ABSTRACT

A light show device includes a light source configured to generate a light beam having a substantially constant diameter, a container having a substantially transparent portion, a plurality of mirrors, each mirror connectable or connected to the container rotatably about at least one axis, and a particulate source configured to create inside the container a substantial suspension of particulates, where the device is configured to allow a reflection of the light beam between at least a majority of the mirrors.

31 Claims, 3 Drawing Sheets

LIGHT SHOW DEVICE AND METHOD OF ENTERTAINING

BACKGROUND

Lasers are very inexpensive devices, but are used in relatively few toys or novelty items.

There is a need for mentally stimulating, educational, aesthetically pleasing laser light show toys, such as games, puzzles, mazes, and the like.

SUMMARY OF THE INVENTION

The present invention aims to solve one or more of these and other problems.

According to an embodiment of the present invention, a light show device comprises: a light source configured to generate a light beam having a substantially constant diameter; a container comprising a substantially transparent portion; a plurality of mirrors, each mirror connectable or connected to the container rotatably about at least one axis; and a particulate source configured to create inside the container a substantial suspension of particulates, wherein the device is configured to allow a reflection of the light beam between at least a majority of the plurality of mirrors.

According to an embodiment of the present invention, a method of entertaining comprises: a) providing a light show device, the device comprising: a light source configured to generate a light beam having a substantially constant diameter; a container comprising a substantially transparent portion; and a plurality of mirrors, each mirror connectable or connected to the container rotatably about at least one axis, wherein the device is configured to allow a reflection of the light beam between at least a majority of the plurality of mirrors; b) illuminating said light source, wherein said light beam is aimed at a first mirror of said plurality of mirrors; c) aiming said light beam at a second mirror of said plurality of mirrors at least by rotating said first mirror with respect to said container; d) aiming said light beam at a subsequent mirror of said plurality of mirrors at least by rotating a previous mirror with respect to said container; e) repeating step d) at least five times; f) creating a substantial suspension of particulates inside said container; g) if said container has a closeable opening, closing said closeable opening; and h) if said container comprises a base portion and a case portion configured to mate to the base portion, mating the case portion to the base portion.

DETAILED DESCRIPTION

In the following description, the use of "a," "an," or "the" can refer to the plural. All examples given are for clarification only, and are not intended to limit the scope of the invention.

Figure 1A:
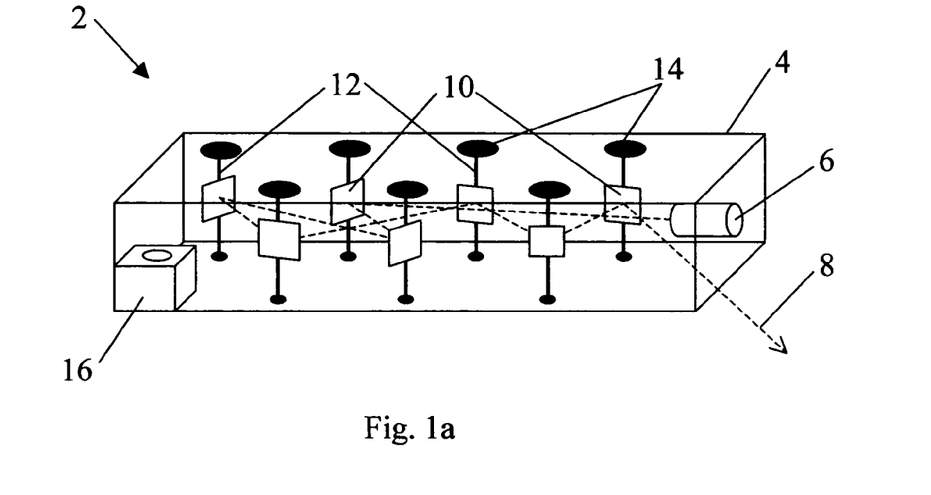
FIG. 1a shows a perspective view of a device according to one embodiment of the present invention.

Referring now to FIG. 1a, a light show device 2 comprises a container 4, a light source 6 configured to generate a light beam 8 (which is preferably, but not necessarily, substantially constant in diameter), a plurality of mirrors 10 connected respectively to rotatable legs or axes 12, and a particulate source 16.

The container 4 preferably has a substantially transparent portion, such that an observer may observe the light show occurring inside the container 4 from outside of the container 4. In the embodiment shown in FIG. 1a, the entire container 4 may be substantially transparent. The container 4 may comprise any relatively hard material, such as plastics, metals, glasses, polymers, crystals, etc., and the substantially transparent portion may comprise any substantially transparent material, most notably plastics and glasses. The container 4 may have an shape, such as a parallelepiped, a sphere, an oval cross section, a rectangular cross section, a triangular cross section, and so forth.

The light source 6 may be a laser (any type or color known in the art, preferably in the visible spectrum) or a focused beam of light, such as light from an incandescent bulb, LED, fluorescent bulb, halogen bulb, or the like, having a preferably substantially constant diameter. For example, as understood by one of ordinary skill in the art, a beam having a substantially constant diameter may be formed by passing light generated from a filament through a converging lens. Further, the light source 6 may include a color filter (not shown) so that the light beam 8 has only limited frequencies, and/or the color filter may be variable (such as by mechanically rotating a multicolored translucent disk in front of the light bulb) so that the light beam 8 changes colors during the light show. Alternatively or in addition, the light source 6 may include more than one bulb, LED, or laser, each producing light of a different color. Further, the light source 6 may include devices (e.g., optical and/or electrical components) configured to alter characteristics of the light beam 8, such as diameter, polarization, length of and/or distance between light pulses if the light source 6 pulses or strobes, both of which are with the scope of the present invention.

The light source 6 may be located inside or outside of the container 4, and may be operated by any means known. For example, in the case of a standard laser, the light source 6 may simply be connected to an electrical energy source (e.g., battery, not shown) and a switch (not shown) to allow the user to turn the laser on and off. The light source 6 may also be adjustable with respect to aim, so that the light beam 8 may be aimed at one of several mirrors 10 (such as by making the light source 6 rotatable about an axis, not shown, that may be attached to a knob, not shown), or the light source 6 may be fixed with respect to the container 4.

Mirrors 10 may be of any type conventionally known. Alternatively or in addition, one or more of the mirrors 10 may be tinted or layered with a color filter and/or polarizer to provide additional fun effects. For example, a first mirror 10 may be coated with a slightly yellowish coating, and a second mirror 10 may be coated with a slightly bluish coating. Then, when the light source 6 generates a white light beam 8, and when the user reflects the light beam 8 first off the first mirror 10, then off the second mirror 10, and when the particulate source creates the particle suspension inside the container 4, then the user will see a white light beam 8 going to the first mirror 10, a yellowish light beam 8 going to the second mirror 10, and a greenish light beam 8 reflected from the second mirror 10. Alternatively or in addition, one or more of the mirrors 10 may include a layer of polarization that may vary from mirror to mirror in angular orientation. Thus, reflecting the light beam 8 among some mirrors 10 may mostly or fully attenuate the light beam 8, whereas among other mirrors 10, little or no attenuation occurs.

Alternatively or in addition, the above-mentioned effects may be variable with respect to each individual mirror 10. For example, a rotatable multicolored translucent disk located directly in front of one or more mirrors 10 may be rotatable (such as using a motor and gear system) by a user, so that the frequency ranges of light reflected by each respective mirror 10 is adjustable by the user. The angle of polarization may be changed in a similar manner. These are merely examples; any known methods of changing the polarization angle and/or color of light reflected from a mirror known in the art are within the scope of the present invention.

Each mirror 10 may be affixed to a rotatable leg or axis 12 that is configured to rotate the mirror 10. The axis 12 may span a length from a top to a bottom of the container 4, and a top portion of the axis 12 may extend through an upper wall of the container 4 and connect to a knob 14 (which is located externally to the container 4), so that a user may manually rotate the mirror 10 by rotating knob 14. The hole in the upper wall through which the axis 12 passes to connect to the knob 14 may be sealed to an extent necessary to prevent much or any of the particulate suspension from escaping through the hole. For example, there may be a rubber or plastic gasket located between the axis 12 and the hole, as understood by one of ordinary skill in the art. In the embodiment shown in FIG. 1a, the mirrors 10 are each manually rotatable by rotating knobs 14. However, any means of rotating the mirrors 10 are within the scope of the present invention, such as using motorized (e.g., electric or pneumatic) or magnetic driving mechanisms. For example, instead of passing the axis 12 through the wall of the container 4, the axes 12 may all be completely located inside container 4, which may be sealed air-tight, and magnetic arms (not shown) may be attached to each of the mirrors 10. Thus, by manipulating a series of corresponding magnets located outside the container 4, that attract the magnets inside the container 4 and connected to the mirrors 10, the angular orientation of the mirrors 10 may be manually adjusted externally to the container 4 without the need for creating holes in the container 4 wall. The axes 12 are preferably fixed with respect to the container 4 and may rotate with respect to it by placing a bearing between them. For less expensive models of the present device, no bearing is needed at all. (For example, a cylindrical end of an axis 12 may be inserted into a corresponding cylindrical recess in the container 4 wall.)

In the embodiment shown in FIG. 1a, each axis 12 is associated with one corresponding mirror 10, the plane of each mirror 10 is substantially parallel to its corresponding axis 12, all of the axes 12 are substantially parallel, and each mirror 10 is independently rotatable with respect to the container 4. The result is a single "layer" light show (in the sense that all of the mirrors 10 are designed to reflect the light beam 8 around substantially in a single plane). Of course, these need not be the case. For example, each axis 12 may have two or more mirrors 10 (and each mirror 10 on an axis 12 may or may not be independently rotatable via a multi-layered knob 14, not shown). For example, two mirrors 10 may be connected to an axis 12 and may be independently rotatable. One way of implementing this would be to have the leg/axis 12 comprise a solid inner rod and an outer tube that fits snugly about the inner rod. One knob 14 would be attached to the inner rod and another knob (not shown) would be attached to the outer tube, with one of the two mirrors 10 attached to the inner rod and the other to the outer tube. The knobs would preferably be positioned concentrically, and rotating the outer knob would rotate the mirror(s) 10 attached to the outer tube, while rotating the inner knob would rotate the mirror(s) 10 attached to the inner rod.

The device 2 may include more than one light source 6, so that several "layers" of a light show may be created inside a single device 2. Alternatively or in addition, the plane of each mirror may be angled so as to not be parallel to its corresponding axis 12. Thus, the light beam 8 may be reflected "up and down" among the various "layers" inside of the light show.

The particulate source 16 is configured to generate a substantial suspension of particles, preferably so that the inside of the container 4 becomes translucent, allowing the ready viewing of the light beam 8 reflecting among the various mirrors 10 inside container 4. Particulate sources 16 are well known, and may include smoke generators, fog generators, disturbed fine powders, and so forth. For example, a smoke generator may be based on combustion, such as by heating (e.g., using an electric coil or squib) a combustible material (e.g., a natural or synthetic oil) to combust with the air inside the container 4. For example, the smoke generator may comprise a small heating element, which may be powered by batteries, and a squeeze bulb containing and configured to deliver to the heating element a drop of "smoke liquid," similar to the smoke generators used on old-fashioned toy trains. A fog generator may be based on turning a liquid into tiny droplets or particles that are so small that they "float" or are suspended in the air inside the container 4. Another way of forming a particle suspension is by distributing a fine powder into the air inside the container 4. For example, the particulate source 16 may comprise a fine powder and a battery-operated electric fan that is configured to blow the fine powder around inside the container 4 so as to create a translucent cloud or particulate suspension. Other known methods for creating a translucent particle suspension inside container 4 are within the scope of the present invention.

In operation, a user turns on the light source 6. The light beam 8 of source 6 may or may not already be aimed at a mirror 10; if not, the user aims the light beam 8 at a mirror 10. Typically, while a laser beam cannot be seen from its side in a clear, clean medium, the laser beam 8 may be visually aimed because either particulates in the air or on the mirror 10 reflect a small amount of light out from the beam 8, or the laser beam 8 may be seen reflecting off any layers (e.g., color filters) that may exist on the mirror 10. If the beam 8 is too difficult for the user to see and aim, the particulate source 16 may be used to suspend enough particulates inside the container 4 to allow visual perception of the beam 8.

Next, the user rotates the first mirror 10 (which the beam 8 is aimed at), by manually turning the knob 14 corresponding to the first mirror 10, until the reflected beam is aimed at a second mirror 10 of the user's choice. Then, the user rotates the knob 14 corresponding to the second mirror 10 until the reflected beam is aimed at a third mirror 10 of the user's choice. This process is repeated for subsequent mirrors, such as five, ten, fifteen, or more times, until the user is satisfied with the number of light beam reflections, and an visually stimulating "laser maze" is created. Then, if the density of the particulate suspension is inadequate in the user's opinion (i.e., the cloud is not sufficiently translucent), the user may operate the particulate source 16 to increase its density to a desired level. By rotating knobs 14, a large number of possible configurations or laser light shows may be formed.

The device 2 is educational, as it helps to explain to children the concepts of light, optics, lasers, and so forth. The device 2 may be used as a toy for children or novelty device for science-loving adults, or as an adjustable work of art, or even as a low-light lamp. Once an initial mirror configuration is created, the particulate source 16 may be configured to maintain a certain level of translucence inside the container 4 (e.g., using a light sensor and computer processor, not shown), and the lamp may simply be turned on and off by turning the laser on and off. The device 2 may be used as a toy for children, by providing the device to a child 2 and inciting the child to perform any or all of the above-mentioned steps.

Figure 1B:
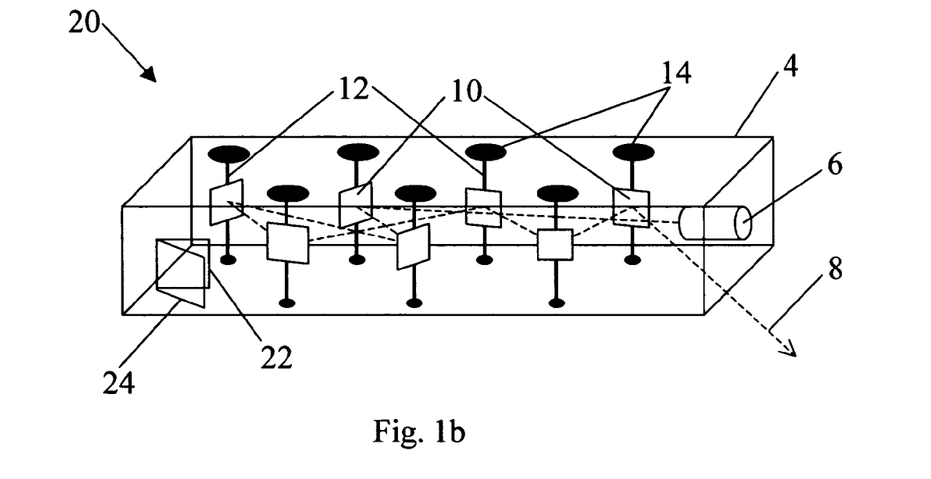
FIG. 1b shows a perspective view of a device according to another embodiment of the present invention.

Referring now to FIG. 1*b*, the particulate source 16 need not be located inside, or even attached to, the container 4 of a light show device 20. A particulate source may be located externally to the container 4. For example, the smoke from a burning cigarette or stick of incense, or the fog from an externally operated fog generator, may be fed into the container 4 via a closeable opening 22 to generate the particulate suspension inside the container 4. Of course, the cigarette or burning incense may also be placed temporarily inside the container 4 for a similar effect. When there is a sufficient suspension, a door 24 to the opening 22 may be closed, so as to seal in the suspension in the container 4. Further, the device 20 may include a pouch or package of a very fine powder, which may be fed into the container 4 via the opening 22. When the door 24 is closed, the powder may serve as the particulate source 16 which, when the device 20 is flipped over, turned side-to-side, or lightly shaken, randomly distributes into the air as a translucent particulate suspension. The opening 22 may also be used to occasionally wash the inside of the container 4, so that particulates that have settled on the walls of the container 4 do not permanently obscure the view of the light show.

Figure 2:
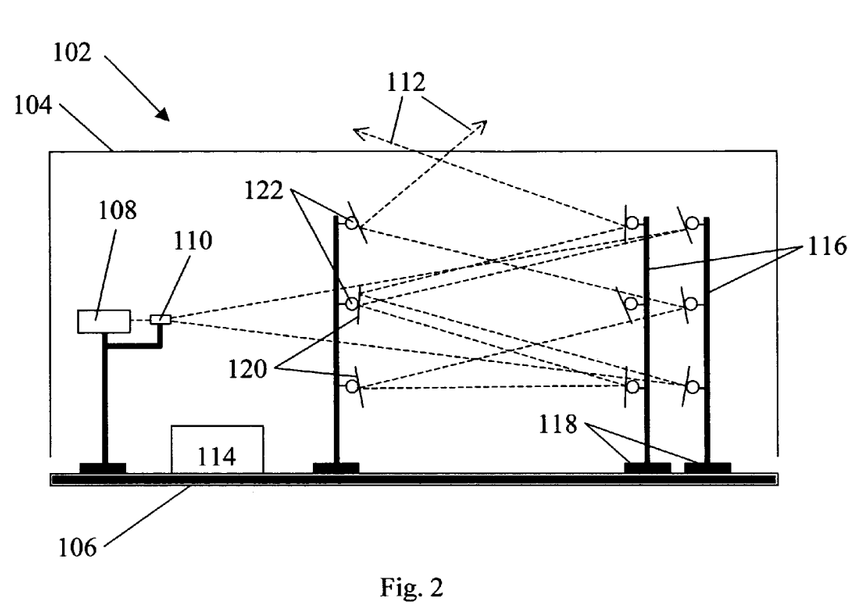
FIG. 2 shows a side view of a device according to another embodiment of the present invention.

Referring now to FIG. 2, a side view of another embodiment is shown. A light show device 102 comprises a case portion 104, a base portion 106 that is configured to be mated with the case portion 104, a light source 108 configured to generate a light beam that is split into two light beams 112 via a beam splitter 110, a particulate source 114 (which is preferably similar to the particulate source 16 in FIG. 1*a*), and a plurality of mirrors 120 mounted on legs 116 that are connected or connectable to the base portion 106 via connectors 118.

The case portion 104 is preferably substantially transparent, or at least has a portion that is substantially transparent, to allow viewing of the light show. In the embodiment shown, the case 104 portion is box-like with one side (the bottom side) missing, such that mating with the base portion 106 creates an enclosed container in which the particulate suspension may be created, although the shapes of the case and base portions 104, 106 may be reversed or made similar. Further, the mated portions 104, 106 may have any desired cross section, such as a dome-type cross section (i.e., a "D" on its side). The case portion 104 may comprise any of the materials discussed previously, such as a clear plastic or glass. The portions 104, 106 may mate simply by conforming to each other's shape, so that the case portion 104 may be placed on top of the base portion 106 and held in place by gravity, to form an enclosed container. In addition, the portions 104, 106 may be attached together, such as using a clamp or any other known means of attachment.

The base portion 106 preferably comprises a material conducive to connecting legs 116 via connectors 118, and may comprise any of the materials previously mentioned. For example, if connectors 118 comprise magnets, then base portion 106 may comprise a ferromagnetic material, such as iron, so that the connectors 118 will magnetically connect to the base portion 106. Any known means of connection is within the scope of the present invention, such as connection by suction, adhesive, gravity, Velcro™, etc. Regarding gravity, for example, connectors 118 may comprise heavy and/or dense portions such that legs 116 remain relatively stable wherever on the base portion 106 they are placed. Further, the base portion 106 may comprise a series of holes (not shown), which may or may not be evenly spaced, such as in a regular pattern, and connectors 118 may instead or in addition have the shape of pegs that fit into the holes in the base portion 106. The legs 116 may then be connected to the base portion 106 via the pegs and holes primarily by gravity, or the pegs may fit tightly and with some friction into the holes, so that the legs 116 are connected to the base portion 106 at least in part by friction. In any event, means of connection are very well known, and are included in the scope of the present invention to connect legs 116 to the base portion 106.

The light source 108 may be similar to the light source 6 shown in FIGS. 1*a* and 1*b*, and may or may not include any of the attachments or devices that alter characteristics (e.g., color, pulse length, polarization, diameter, etc.) of the light beam. Beam splitter 110 is configured to split the light beam from the light source 108 into two or more light beams 112. The beam splitter 110 may or may not be attached directly to the light source 108, and the light source 108 may or may not be connected to the base portion 106 via a connector 118 (e.g., a magnet). Preferably, the connector 118 is such that the light source 108 may be rotated and/or moved laterally along the upper surface of the base portion 106. If the connector 118 comprises a peg that fits into holes in the base portion 106, then the light source 108 will only be able to be moved laterally discretely, while if the connector 118 is a magnet, suction-type connector, heavy weight, etc., then light source 108 may be moved continuously laterally along the base portion 106, as understood by one of ordinary skill in the art. Further, the connector 118 may be configured to allow the light source 108 to be rotated either discretely or continuously.

Each leg 116 may connect one or more (e.g., three, as shown in FIG. 2) mirrors 120 to the base portion 106 via a corresponding connector 118. Each mirror 120 may be connected to the leg 116 via a connector 122 that can rotate with respect to at least one axis. For example, connector 122 may be a pivot or hinge having an axis of rotation that is perpendicular to an axis of the leg 116. Thus, the mirror 120 may be aimed in virtually any direction simply by rotating the leg 116 about its axis and/or rotating the mirror 120 about the axis of connector 122. Alternatively, the connector 122 may be a ball-socket connector, allowing the mirror 120 to rotate with respect to infinitely many axes so that the mirror may be aimed in virtually any direction independently of the angular orientation of the leg 116. Other connectors 122 that allow rotation of the mirror 120 in one or more axes are well known and included within the scope of the present invention. Legs 116 may comprise any hard material, such as plastic, metal, polymers, etc.

In operation, the case portion 104 of the device 102 is removed. The light source 108, and any desired characteristic modifiers and/or attachments (e.g., beam splitter 110), are connected to the base portion 106 via connector 118, and positioned laterally and rotationally in a desired manner. A first leg 116, configured to connect three mirrors 120 to the base portion 106, is placed on the base portion 106 and connected thereto in a desired lateral and rotational position, such as by magnetism. (Of course, all legs 116 may already be connected to the base portion 106, and one by one removed and connected in a desired lateral and rotational position.) At least one of the light beams 112 (if there are more than one) is aimed at one of the mirrors 120 of the connected leg 116. A second leg 116, configured to connect three mirrors 120 to the base portion 106, is placed on the base portion 106 and connected thereto in a desired lateral and rotational position. The direction of the mirror 120 of the first leg 116, to which the light beam 112 is aimed, is adjusted by rotating the leg 116 and/or rotating the mirror 120 about the axis of connector 122, until the reflected light beam 112 is aimed at one of the mirrors 120 on the second leg 116. This process is repeated five, ten, fifteen, twenty, or more times until an intricate, beautiful, complicated maze (as that shown in FIG. 2) is created of the light beam(s) 112.

Next, the case portion 104 is mated to the base portion 106 to form an enclosed container, and the particulate source 114 is activated to fill the container with a translucent particulate suspension, to thus allow ready viewing of the light pattern created by the light show device 102. In a preferred embodiment, connectors 122 are capable of allowing fine changes in the direction of their corresponding mirrors 120, but also prevent movement of the mirrors' directions after being aimed in the desired direction. For example, connectors 122 could utilize clamps (that hold the mirrors 120 in place by friction) or finely spaced notches, as understood by one of ordinary skill in the art.

In the embodiment in FIG. 2, the legs 116 are connectable and removable from the base portion 106, such as in the case that connectors 118 are magnetic. In another embodiment, legs 116 are fixed in predetermined lateral (and/or rotational) positions on the base portion 106. Further, in the embodiment in FIG. 2, mirrors 120 are connected to the legs 116 in fixed vertical positions, but alternatively may be removable and connectable to the legs 116 in various other vertical positions. For example, connectors 122, as well as allowing for rotation of the mirrors 120 relative to at least one axis, may also include clamps (or the equivalent) to allow the mirrors 120 to be removed and, if desired, connected to other vertical positions of the same or a different leg 116. The light source 108 may or may not be permanently laterally fixed to the base portion 106. The light source 108 may or may not be permanently rotationally fixed to the base portion 106. The legs 116 may or may not be permanently laterally fixed to the base portion 106. The legs 116 may or may not be permanently rotationally fixed to the base portion 106. The mirrors 120 may or may not be permanently vertically fixed to their corresponding legs 116.

In the embodiment shown in FIG. 2, particularly in the case where the mirrors 120 are vertically adjustable or movable along legs 116, the mirrors 120 are connectable to the base portion 106 via legs 116 and connectors 118 such that no plane passes through all the mirrors 120—i.e., the mirrors 120 are not coplanar, as understood by one of ordinary skill in the art. Further, because the mirrors 120 are connectable to the base portion 106 in such a manner that they are not coplanar, the light show device 102 is necessarily capable of creating a light show that is not coplanar (i.e., there exists no plane such that all of the reflected light beams 112 fall within the plane). In the embodiment shown in FIG. 2, the configuration has been drawn for simplicity, and it appears that the top three mirrors 120 are coplanar, the middle three mirrors 120 are coplanar, and the bottom three mirrors 120 are coplanar. Thus, the mirrors 120 are connected or connectable to the base portion 106 such that no two planes pass through all of the mirrors 120, but there may be three planes that pass through all of the mirrors 120. If the mirrors 120 are not fixedly connected to the legs 116—i.e., they may be vertically adjusted, such as by removing and reconnecting them at differing vertical levels—then the mirrors 120 are connectable to the base portion 106 in such a manner that no three planes (or even no four, five, six, seven, and so forth, planes) pass through all of the mirrors 120. This need not be the case, but the mirrors 120 are configured so that this is at least possible.

Figure 3:
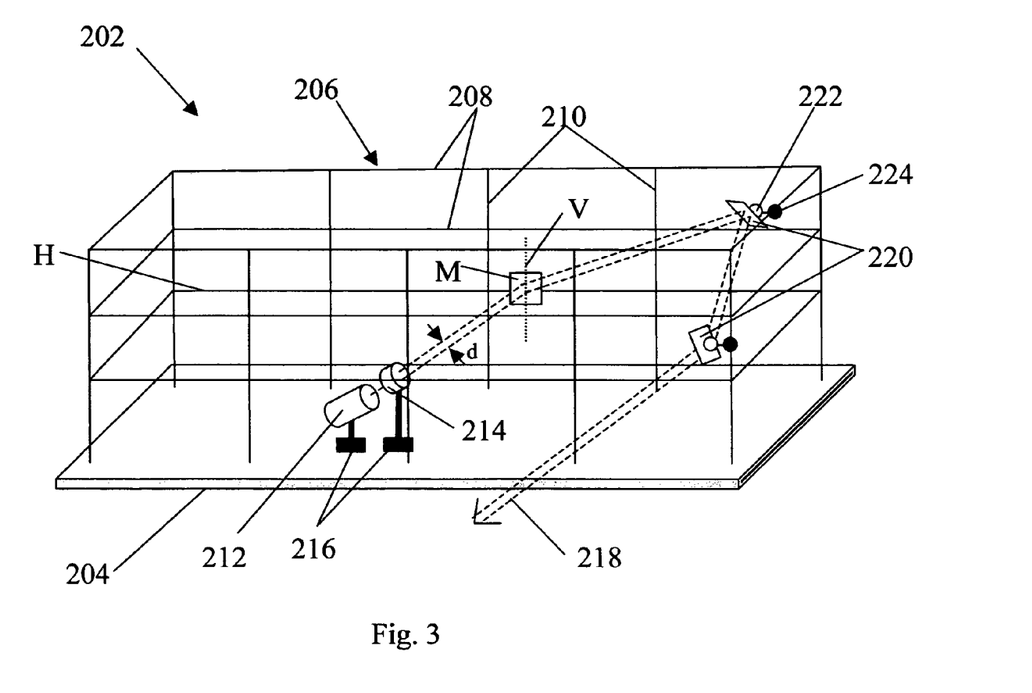
FIG. 3 shows a perspective view of a device according to another embodiment of the present invention.

Referring now to FIG. 3, another embodiment of the present invention is shown. A light show device 202 comprises a base portion 204, a frame 206, a light source 212 configured to generate a light beam 218, a lens 214 configured to increase a diameter d of the light beam 218, and mirrors 220 that are connected or connectable to the frame 206.

The light show device 202 includes a case portion, as in case portion 104 in FIG. 2, which is not shown in FIG. 3 for reasons of clarity. As in FIG. 2, the case portion may be completely substantially transparent, or may comprise a substantially transparent portion, to allow ready viewing of the light show. The light source 212 may be fixedly connected or otherwise removable and connectable to the base portion 204 via connector 216, which may, for example, be a magnet that is magnetically attracted to a ferromagnetic material in the base portion 204. Of course, connector 216 may be any connector (fixed, adjustable, or removable/connectable) known in the art and/or previously discussed. Further, lens 214 may be connected or connectable to the base portion 204 via connector 216, or may be connected directly to the light source 212. Alternatively or in addition, light source 212 and/or lens 214 may be connected and/or connectable to the frame 214 instead of the base portion 204. In one embodiment, the aim of the light beam 218 may be adjustable by any means known in the art (e.g., by connecting the light source 212 to the connector 216 via a ball-socket connector that allows rotation of the light source 212 about at least two perpendicular axes, as understood by one of ordinary skill in the art).

The frame 206 may comprise a fence structure, such as that shown in FIG. 3, comprising a series of horizontal posts 208 and vertical posts 210 connected to each other, to which mirrors 220 may be connected via connectors 224. Any other fence structure is within the scope of the present invention, such as a diamond-shaped fence (e.g., a series of connected diagonal posts). The frame 206 allows mirrors 220 to be attached at a variety of horizontal and vertical points and levels. The frame 206 may be "notched" to allow discrete connection of the mirrors 220 to the frame 206, or the posts 208, 210 may be relatively smooth and connectors 224 may be clamps or their equivalent to allow the mirrors 220 to be moved continuously along either or both of posts 208, 210. The frame 206 may comprise any hard material, such as plastic or metal. Another benefit to the fence structure in one embodiment of the frame 206 is that it allows human hands to easily and efficiently connect and/or adjust the positions and directional aim of mirrors 220, by allowing passage of human fingers through the gaps between adjacent posts 208, 210. However, a fence structure is not necessary. For example, the frame may comprise a substantially solid structure, such as four connected ferromagnetic sheets, and connectors 224 may comprise magnets that are connectable to the frame 206 at, effectively, infinitely many horizontal/vertical levels of the frame 206. As shown, the frame 206 has a box shape, substantially surrounding the enclosure created by mating the base portion 204 to the case portion (not shown). However, the frame 206 may also include portions, e.g., "inside" the region enclosed by the shown frame 206, to allow for more options for mounting or connecting the mirrors 220 to the frame 206.

Mirrors 220 are preferably adjustable as to their direction (e.g., of their relative reflectivity axis), such as by ball-socket connectors 222 or the equivalent. Alternatively or in addition, each mirror 220 may be rotatable about the axis of the post 208, 210 to which the mirror 220 is connected, and also rotatable about an axis of the connector 222 that is perpendicular to such axis. For example, refer now to example mirror M which has connectors 222, 224 (not shown with respect to example mirror M, because they would be located behind mirror M in FIG. 3). In this example, posts 208, 210 may be smooth cylinders, and connector 224 may be a clamp or other friction-type connector, so that the horizontal post 208 to which the mirror M is connected via connector 224 acts as a horizontal axis H about which the mirror M may rotate. Further, connector 222 may be a hinge-type connector, allowing the mirror M to rotate about the connector's 222 axis V, which is a vertical axis perpendicular to horizontal axis H (although the axes of rotation need not be perpendicular to allow rotation of the mirror M into any desired solid angle). Such allows mirror M to be directed to infinitely many angles in a 2-D solid angle, as understood by one of ordinary skill in the art. Of course, mirrors 220 may alternatively be fixedly connected to the frame 206 via fixed connectors 224, and connectors 222 may be connectors that allow the mirrors 220 to rotate in about infinitely many axes.

As in the embodiment shown in FIG. 2, the mirrors 220 may be connected to or configured to connect to the frame 206 and/or base portion 204 such that no one, two, three, etc., planes pass through all mirrors 220. Such allows a beautiful light show wherein the light beam 218 reflects in a complicated three-dimensional configuration.

In operation, a user may begin with the frame 206 attached to the base portion 204, and the case portion (not shown) may not be mated to the base portion 204. The mirrors 220, light source 212, and any attachments (e.g., lens 214, beam splitter 110, etc.) may not be connected to the device 202. One by one, the user may connect the light source 212, attachments, and mirrors 220 to the base portion 204 and/or frame 206, aiming the light source's beam 218 at a first mirror 220, aiming the beam reflected from the first mirror 220 to a second mirror, and so forth, until the user is satisfied that an interesting, educational, and/or aesthetically pleasing "maze" of light beam 218 has been formed. In doing so, the user may connect mirrors 220 to the frame 206 and adjust the aim direction of the mirrors 220 as desired, such as by rotating the mirrors 220 about axes that may be accommodated by connector(s) 222, 224. Next, the case portion (not shown) is mated to the base portion 204, to form an enclosure (which may or may not be tightly sealed), and a particulate source (not shown in FIG. 3, but may be similar to those discussed previously) may then be used to form a translucent cloud or particulate suspension inside the enclosure, to allow the easy viewing of the light show. Alternatively, the particulate source, such as a fog generator, may be used to blow fog toward the frame 206 when the case portion is not yet mated to the base portion 204, and before all the fog has dissipated, the case portion could then be mated to the base portion 204 to trap some of the fog in the enclosure.

In another embodiment, applicable preferably to the embodiments shown in FIGS. 2 and 3, one or more mirrors 120, 220 may actually comprise two mirrors, attached and fixed relative to each other, having reflection planes that are offset from one another by an angle in the range of 5° to 175°, preferably in the range of 45° to 135°, and preferably approximately 90°. Where the angle is 90°, the two-mirror system acts, in some sense, as a single mirror, except that the reflected beam is offset by a discrete distance, as understood by one of ordinary skill in the art. Further, mirror systems may contain more than two mirrors fixedly attached to each other, having different reflection planes, to provide more interesting options, as well as more varied and interesting light shows.

In a preferred embodiment, the present invention is a relatively small light show for entertainment and/or educational purposes, and the enclosure enclosed by the container 4 and/or base and case portions 104, 106 may have a volume not larger than approximately two cubic feet, preferably less than one cubic foot, and preferably less than 0.5 cubic feet. Most of the embodiments described herein have represented simple versions for clarity of explanation. As understood by one of ordinary skill in the art, many of the features and/or aspects of the embodiments described herein may be "mixed and matched" to the extent physically possible to satisfy individual design requirements. Further, variations on the above discussed embodiments are within the scope of the present invention. For example, any of the mentioned attachments or devices to alter a characteristic(s) of the light beam may be applied to any and all of the disclosed embodiments. As another example, one or more of the mirrors 120, 220 in FIGS. 2 and 3 may be coated with a filter to alter a color, polarization, etc. of the light reflected from the mirrors 120, 220, as described with respect to the embodiment in FIGS. 1a and 1b. Further, any of the disclosed embodiments may be permanently sealed, or may be openable, such as with a closable opening 22 in FIG. 1b (which closeable opening also includes the opening on the bottom of the case portion 104 in FIG. 2 which is closable with base portion 106). Any of the mirrors disclosed may be permanently fixed to the container, rotatable with respect to only one axis (as in FIG. 1a), or may be rotatable about at least two axes, or the mirrors may be movable laterally and/or vertically along the base portion, as well as rotatable about at least one axis, and so forth. Further, all of the mirrors may be independently movable and/or rotatable, or some of the mirrors may be fixedly attached to each other so that they are not independently movable or rotatable.

I claim:

1. A light show device, comprising:
    a light source configured to generate a light beam having a substantially constant diameter;
    a container comprising a substantially transparent portion;
    a plurality of mirrors, each mirror connectable or connected to the container rotatably about at least one axis; and
    a particulate source configured to create inside said container a substantial suspension of particulates,
    wherein the device is configured to allow a reflection of the light beam between at least a majority of the plurality of mirrors, and
    wherein the plurality of mirrors comprises:
        a first mirror rotatable about a first axis;
        a second mirror rotatable about a second axis;
        a third mirror rotatable about a third axis; and
        a fourth mirror rotatable about a fourth axis,
        wherein the first, second, third, and fourth axes are different and substantially parallel, and
        wherein the first through fourth mirrors are independently rotatable.

2. The light show device as claimed in claim 1, wherein the container has a volume not larger than approximately one cubic foot.

3. The light show device as claimed in claim 1, wherein the light source comprises a laser.

4. The light show device as claimed in claim 1, further comprising a beam splitter configured to split the light beam into at least two light beams.

5. The light show device as claimed in claim 1, further comprising at least one lens configured to alter a diameter of the light beam.

6. The light show device as claimed in claim 1, wherein at least three of said mirrors are independently rotatable.

7. The light show device as claimed in claim 1, wherein the first through fourth mirrors are manually rotatable from outside of the container.

8. The light show device as claimed in claim 1, wherein the first through fourth mirrors are rotatable about only said first through fourth axes, respectively.

9. The light show device as claimed in claim 1, wherein the first through fourth axes are fixed with respect to the container.

10. The light show device as claimed in claim 1, wherein the particulate source comprises a combustion smoke generator.

11. The light show device as claimed in claim 1, wherein the particulate source comprises a fog generator.

12. The light show device as claimed in claim 1, wherein the particulate source comprises a powder.

13. The light show device as claimed in claim 1, wherein the container is sealed.

14. The light show device as claimed in claim 1, wherein the container comprises a closeable opening through which particulates from the particulate source may be introduced into the container.

15. The light show device as claimed in claim 1, wherein each of the plurality of mirrors is connectable or connected to the container in such a manner that no plane passes through all of said plurality of mirrors.

16. The light show device as claimed in claim 1, wherein each of the plurality of mirrors is connectable or connected to the container in such a manner that no two planes pass through all of said plurality of mirrors.

17. The light show device as claimed in claim 1, wherein each of the plurality of mirrors is connectable or connected to the container in such a manner that no three planes pass through all of said plurality of mirrors.

18. The light show device as claimed in claim 1, wherein the container comprises a base portion and a case portion configured to mate with the base portion.

19. The light show device as claimed in claim 18, wherein the case portion comprises the substantially transparent portion, and wherein the device is configured so that the mirrors are manually adjustable when the base portion and case portion are not mated and not manually adjustable when the base portion and case portion are mated.

20. The light show device as claimed in claim 1, wherein the container comprises a base portion and a case portion configured to mate with the base portion, and wherein the base portion comprises a frame to which the plurality of mirrors are connected or connectable.

21. A method of entertaining a child, comprising:
providing the light show device as claimed in claim 1 to a child; and inciting said child to perform the following steps:
a) illuminating said light source, wherein said light beam is aimed at the first mirror of said plurality of mirrors;
b) aiming said light beam at the second mirror of said plurality of mirrors at least by rotating said first mirror with respect to said container;
c) aiming said light beam at a subsequent mirror of said plurality of mirrors at least by rotating a previous mirror with respect to said container,
d) repeating step c) at least five times;
e) creating said substantial suspension of particulates inside said container;
f) if said container has a closeable opening, closing said closeable opening; and
g) if said container comprises a base portion and a case portion configured to mate to the base portion, mating the case portion to the base portion.

22. A light show device, comprising:
a light source configured to generate a light beam having a substantially constant diameter;
a container comprising a substantially transparent portion;
a plurality of mirrors, each mirror connectable or connected to the container rotatable about at least one axis; and
a particulate source configured to create inside said container a substantial suspension of particulates,
wherein the device is configured to allow a reflection of the light beam between at least a majority of the plurality of mirrors,
wherein the container comprises a base portion and a case portion configured to mate with the base portion, and
wherein the device further comprises a plurality of legs connectable or connected to the base portion and independently movable with respect to the base portion, each leg configured to connect at least one mirror to said base portion.

23. The light show device as claimed in claim 22, wherein the plurality of legs are magnetically connectable to the base portion.

24. The light show device as claimed in claim 22, wherein at least one leg is configured to connect at least two mirrors to said base portion.

25. The light show device as claimed in claim 22, wherein a first leg of said plurality of legs is configured to connect a first mirror to said base portion, wherein said first leg is connectable or connected to said base portion rotatably about a first axis, and wherein said first mirror is connectable or connected to the container rotatably about a second axis that is not parallel to said first axis.

26. The light show device as claimed in claim 25, wherein the first leg is configured to connect the first mirror and a second mirror to said base portion.

27. The light show device as claimed in claim 22, wherein the legs are continuously movable with respect to the base portion.

28. A method of entertaining a child, comprising:
providing the light show device as claimed in claim 22 to a child; and inciting said child to perform the following steps:
a) illuminating said light source, wherein said light beam is aimed at a first mirror of said plurality of mirrors;
b) aiming said light beam at a second mirror of said plurality of mirrors at least by rotating said first mirror with respect to said container;
c) aiming said light beam at a subsequent mirror of said plurality of mirrors at least by rotating a previous mirror with respect to said container;
d) repeating step c) at least five times;
e) creating said substantial suspension of particulates inside said container;
f) if said container has a closeable opening, closing said closeable opening; and
g) if said container comprises a base portion and a case portion configured to mate to the base portion, mating the case portion to the base portion.

29. A light show device, comprising:
a light source configured to generate a light beam having a substantially constant diameter;
a container comprising a substantially transparent portion;
a plurality of mirrors, each mirror connectable or connected to the container rotatable about at least one axis; and
a particulate source configured to create inside said container a substantial suspension of particulates, wherein the device is configured to allow a reflection of the light beam between at least a majority of the plurality of mirrors, wherein the container comprises a base portion and a case portion configured to mate with the base portion, wherein the base portion comprises a frame to which the plurality of mirrors are connected or connectable, and wherein the plurality of mirrors are connected to the frame and each rotatable with respect to the frame about at least two axes.

30. The light show device as claimed in claim 29, wherein the plurality of mirrors are substantially permanently connected to the frame.

31. A method of entertaining a child, comprising:

providing the light show device as claimed in claim 29 to a child; and inciting said child to perform the following steps:

a) illuminating said light source, wherein said light beam is aimed at a first mirror of said plurality of mirrors;

b) aiming said light beam at a second mirror of said plurality of mirrors at least by rotating said first mirror with respect to said container;

c) aiming said light beam at a subsequent mirror of said plurality of mirrors at least by rotating a previous mirror with respect to said container;

d) repeating step c) at least five times;

e) creating said substantial suspension of particulates inside said container;

f) if said container has a closeable opening, closing said closeable opening; and g) if said container comprises a base portion and a case portion configured to mate to the base portion, mating the case portion to the base portion.

* * * * *